(12) United States Patent
Jain

(10) Patent No.: US 12,106,291 B2
(45) Date of Patent: Oct. 1, 2024

(54) SYSTEMS AND METHODS FOR ELECTRONIC TOKENIZATION OF RESOURCE DISTRIBUTION INSTRUMENTS

(71) Applicant: BANK OF AMERICA CORPORATION, Charlotte, NC (US)

(72) Inventor: Jeetendra Hukmichand Jain, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 196 days.

(21) Appl. No.: 17/680,585

(22) Filed: Feb. 25, 2022

(65) Prior Publication Data

US 2023/0274266 A1 Aug. 31, 2023

(51) Int. Cl.
*G06Q 20/38* (2012.01)
*G06Q 20/10* (2012.01)
*G06Q 20/36* (2012.01)

(52) U.S. Cl.
CPC ....... *G06Q 20/3821* (2013.01); *G06Q 20/108* (2013.01); *G06Q 20/3674* (2013.01)

(58) Field of Classification Search
CPC ............. G06Q 20/3821; G06Q 20/108; G06Q 20/3674; G06Q 20/32
USPC .......................................................... 705/76
See application file for complete search history.

(56) References Cited

U.S. PATENT DOCUMENTS

| | | | |
|---|---|---|---|
| 8,160,960 B1 | 4/2012 | Fei et al. | |
| 9,917,802 B2 | 3/2018 | Melzer et al. | |
| 10,084,738 B2 | 9/2018 | Venkatakrishnan et al. | |
| 10,515,345 B2 | 12/2019 | Koh et al. | |
| 11,004,038 B2 | 5/2021 | Kassemi et al. | |
| 11,295,282 B2 | 4/2022 | Venkatakrishnan et al. | |
| 11,423,430 B2 | 8/2022 | Griffin | |
| 2005/0143108 A1 | 6/2005 | Seo et al. | |
| 2012/0150673 A1* | 6/2012 | Hart | G06Q 20/40 705/17 |
| 2014/0025766 A1 | 1/2014 | Beck et al. | |
| 2014/0089195 A1 | 3/2014 | Ward et al. | |
| 2014/0136407 A1 | 5/2014 | Hazam et al. | |
| 2014/0351713 A1 | 11/2014 | Hallerstrom Sjostedt et al. | |
| 2015/0019655 A1 | 1/2015 | Kizhakkiniyil et al. | |
| 2015/0081349 A1 | 3/2015 | Johndrow et al. | |

(Continued)

*Primary Examiner* — Zeshan Qayyum

(74) *Attorney, Agent, or Firm* — Moore & Van Allen PLLC; Lauren M. Stokes

(57) ABSTRACT

Systems, computer program products, and methods are described herein for electronic tokenization of resource distribution instruments. The present invention may be configured to receive, from a first entity channel, a request for a secure credential for a resource distribution instrument, where the first entity channel received the request from a user device associated with a user. The present invention may be configured to generate, in response to receiving the request, the secure credential and provide, to a resource distribution instrument network, the secure credential and instructions to configure the resource distribution instrument network. The instructions may configure the resource distribution instrument network to provide, in response to receiving a token request using the secure credential from a second entity system, a token for use by the second entity system during distributions between the user and the second entity system.

15 Claims, 3 Drawing Sheets

(56) References Cited

U.S. PATENT DOCUMENTS

| | | |
|---|---|---|
| 2015/0099490 A1 | 4/2015 | Whitten et al. |
| 2015/0264022 A1 | 9/2015 | Manvi et al. |
| 2015/0278813 A1 | 10/2015 | Yue et al. |
| 2016/0055533 A1 | 2/2016 | Tanio et al. |
| 2017/0011383 A1 | 1/2017 | Melzer |
| 2017/0118189 A1 | 4/2017 | Venkatakrishnan et al. |
| 2017/0352026 A1* | 12/2017 | Musil .................. G06Q 20/382 |
| 2020/0210990 A1 | 7/2020 | Laracey et al. |
| 2021/0006609 A1 | 1/2021 | Rosanuru et al. |
| 2022/0027901 A1* | 1/2022 | Yarabolu ................ G06Q 20/34 |
| 2022/0172198 A1* | 6/2022 | Gaur .................. G06Q 20/3821 |

* cited by examiner

SYSTEMS AND METHODS FOR ELECTRONIC TOKENIZATION OF RESOURCE DISTRIBUTION INSTRUMENTS

FIELD OF THE INVENTION

The present invention embraces systems and methods for electronic tokenization of resource distribution instruments.

BACKGROUND

An electronic system may be configured to receive and process requests for tokens that include information identifying a resource distribution instrument associated with a user. The electronic system may be configured to receive the requests via a resource distribution instrument network and provide, in response to the requests, tokens for use in initiating future distributions with the user via the resource distribution instrument network.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, the present invention embraces a system for electronic tokenization of resource distribution instruments. The system may include at least one non-transitory storage device and at least one processing device coupled to the at least one non-transitory storage device, where the at least one processing device may be configured to receive, from a first entity channel, a request for a secure credential for a resource distribution instrument, where the first entity channel received the request from a user device associated with a user, and where the resource distribution instrument is associated with the user and a source retainer. The at least one processing device may be configured to generate, in response to receiving the request, the secure credential, where the secure credential does not include information identifying the resource distribution instrument, and provide, to the first entity channel, the secure credential. The at least one processing device may be configured to provide, to a resource distribution instrument network, the secure credential and instructions to configure the resource distribution instrument network to provide, in response to receiving a token request using the secure credential from a second entity system, a token for use by the second entity system during distributions between the user and the second entity system via the resource distribution instrument network, where the token does not include information identifying the resource distribution instrument, and transfer, in response to a distribution initiated by the second entity system using the token, resources from the source retainer associated with the resource distribution instrument to another source retainer associated with the second entity system.

In some embodiments, the user device may be configured to provide the request to the first entity channel in response to receiving a request for the information identifying the resource distribution instrument from the second entity system.

In some embodiments, the first entity channel may be configured to receive the secure credential and, in response to receiving the secure credential, provide the secure credential to the user device. Additionally, or alternatively, the user device may be configured to receive the secure credential from the first entity channel and, in response to receiving the secure credential from the first entity channel, provide the secure credential to the second entity system. In some embodiments, the second entity system may be configured to provide, to the user device, a request for the information identifying the resource distribution instrument, receive the secure credential from the user device, in response to receiving the secure credential from the user device, provide, to the resource distribution instrument network, the token request using the secure credential, and receive, from the resource distribution instrument network, the token for use during distributions between the user and the second entity system via the resource distribution instrument network. Additionally, or alternatively, the second entity system may be configured to provide, to the resource distribution instrument network, the token to initiate the distribution.

In some embodiments, the at least one processing device may be configured to provide, to the resource distribution instrument network, other instructions to configure the resource distribution instrument network to provide, in response to the token request using the secure credential from the second entity system, a token notification indicating use of the secure credential to the system and receive, from the resource distribution instrument network, the token notification. Additionally, or alternatively, the at least one processing device may be configured to, in response to receiving the token notification from the resource distribution instrument network, provide, to the first entity channel, the token notification.

In some embodiments, the at least one processing device may be configured to provide, to the resource distribution instrument network, other instructions to configure the resource distribution instrument network to, before transferring the resources, determine, in response to the distribution initiated by the second entity system using the token, whether the token has expired, when transferring the resources, transfer the resources based on determining that the token has not expired, and deny the distribution initiated by the second entity system based on determining that the token has expired.

In some embodiments, the at least one processing device may be configured to provide other instructions to configure the resource distribution instrument network to determine, in response to receiving the token request using the secure credential from the second entity system, whether the secure credential has expired and, when providing the instructions to configure the resource distribution instrument network to provide the token, provide the instructions to configure the resource distribution instrument network to provide the token based on determining that the secure credential has not expired.

In some embodiments, the at least one processing device may be configured to, when generating the secure credential, generate a unique secure credential.

In some embodiments, the request for the secure credential includes data identifying the second entity system, and the at least one processing device may be configured to, when generating the secure credential, generate the secure credential based on the data identifying the second entity system, when providing the instructions to configure the resource distribution instrument network to provide the token, provide the instructions to configure the resource distribution instrument network to determine whether the second entity system provided the token request using the secure credential and provide the token only based on determining that the second entity system provided the token request using the secure credential.

In some embodiments, the at least one processing device may be configured to receive, from the first entity channel, another request for another secure credential for the resource distribution instrument, where the other request includes data identifying a third entity system, generate, in response to receiving the other request, the other secure credential, where the other secure credential is different from the secure credential, and provide, to the first entity channel, the other secure credential. Additionally, or alternatively, the at least one processing device may be configured to provide, to the resource distribution instrument network, the other secure credential and instructions to configure the resource distribution instrument network to provide, in response to receiving another token request using the other secure credential from the third entity system, another token for use by the third entity system during distributions between the user and the third entity system via the resource distribution instrument network, where the other token does not include information identifying the resource distribution instrument, and where the other token is different from the token and transfer, in response to another distribution initiated by the third entity system using the other token, resources from the source retainer associated with the resource distribution instrument to a third source retainer associated with the third entity system.

In another aspect, the present invention embraces a computer program product for electronic tokenization of resource distribution instruments. The computer program product may include a non-transitory computer-readable medium including code causing a first apparatus to receive, from a first entity channel, a request for a secure credential for a resource distribution instrument, where the first entity channel received the request from a user device associated with a user, and where the resource distribution instrument is associated with the user and a source retainer. The non-transitory computer-readable medium may include code causing the first apparatus to generate, in response to receiving the request, the secure credential, where the secure credential does not include information identifying the resource distribution instrument, and provide, to the first entity channel, the secure credential. The non-transitory computer-readable medium may include code causing the first apparatus to provide, to a resource distribution instrument network, the secure credential and instructions to configure the resource distribution instrument network to provide, in response to receiving a token request using the secure credential from a second entity system, a token for use by the second entity system during distributions between the user and the second entity system via the resource distribution instrument network, where the token does not include information identifying the resource distribution instrument, and transfer, in response to a distribution initiated by the second entity system using the token, resources from the source retainer associated with the resource distribution instrument to another source retainer associated with the second entity system.

In some embodiments, the user device may be configured to provide the request to the first entity channel in response to receiving a request for the information identifying the resource distribution instrument from the second entity system.

In some embodiments, the first entity channel may be configured to receive the secure credential and, in response to receiving the secure credential, provide the secure credential to the user device. Additionally, or alternatively, the user device may be configured to receive the secure credential from the first entity channel and, in response to receiving the secure credential from the first entity channel, provide the secure credential to the second entity system. In some embodiments, the second entity system may be configured to provide, to the user device, a request for the information identifying the resource distribution instrument, receive the secure credential from the user device, in response to receiving the secure credential from the user device, provide, to the resource distribution instrument network, the token request using the secure credential, and receive, from the resource distribution instrument network, the token for use during distributions between the user and the second entity system via the resource distribution instrument network.

In yet another aspect, a method for electronic tokenization of resource distribution instruments is presented. The method may include receiving, from a first entity channel, a request for a secure credential for a resource distribution instrument, where the first entity channel received the request from a user device associated with a user, and where the resource distribution instrument is associated with the user and a source retainer. The method may include generating, in response to receiving the request, the secure credential, where the secure credential does not include information identifying the resource distribution instrument, and providing, to the first entity channel, the secure credential. The method may include providing, to a resource distribution instrument network, the secure credential and instructions to configure the resource distribution instrument network to provide, in response to receiving a token request using the secure credential from a second entity system, a token for use by the second entity system during distributions between the user and the second entity system via the resource distribution instrument network, where the token does not include information identifying the resource distribution instrument, and transfer, in response to a distribution initiated by the second entity system using the token, resources from the source retainer associated with the resource distribution instrument to another source retainer associated with the second entity system.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
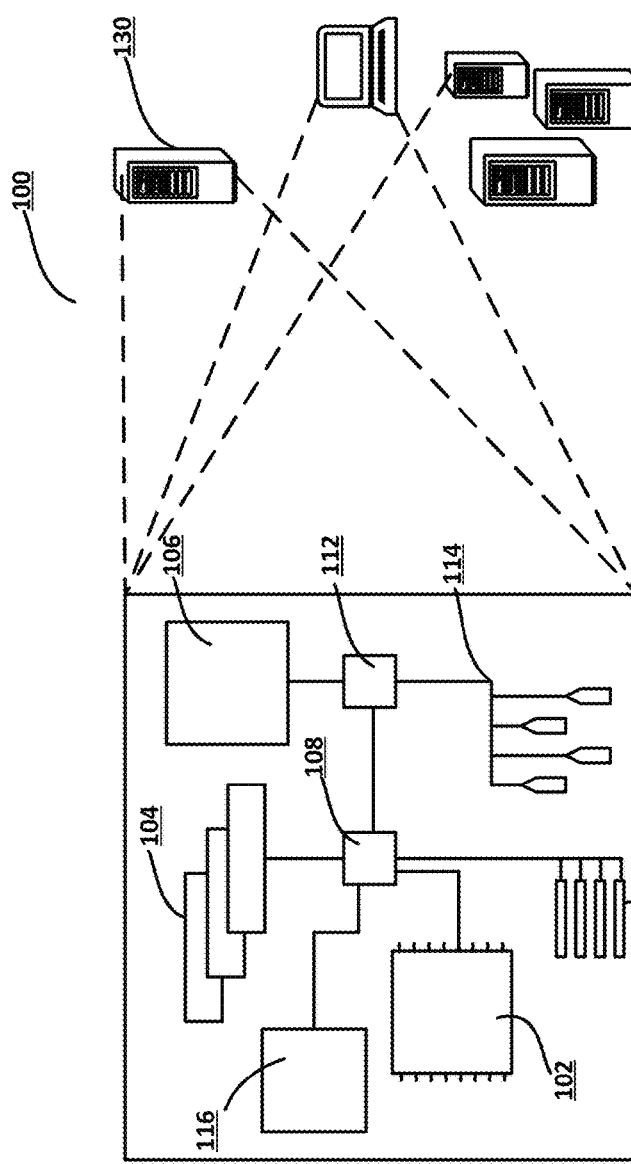
Figure 1:
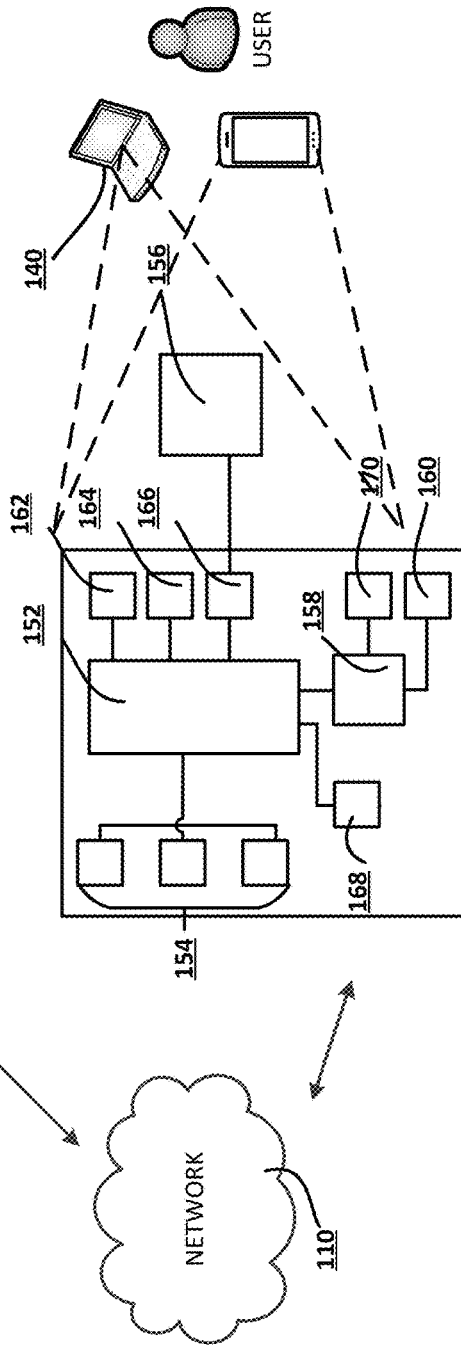
Figure 2:
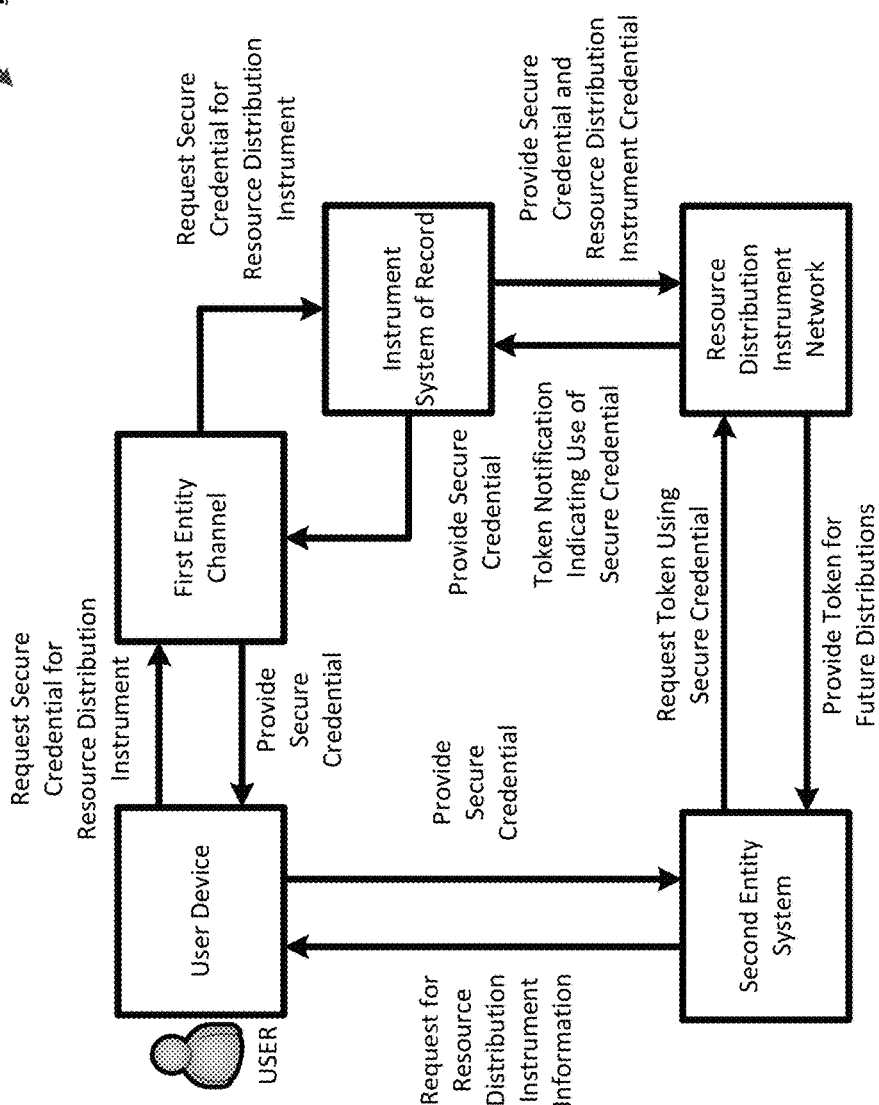
Figure 3:
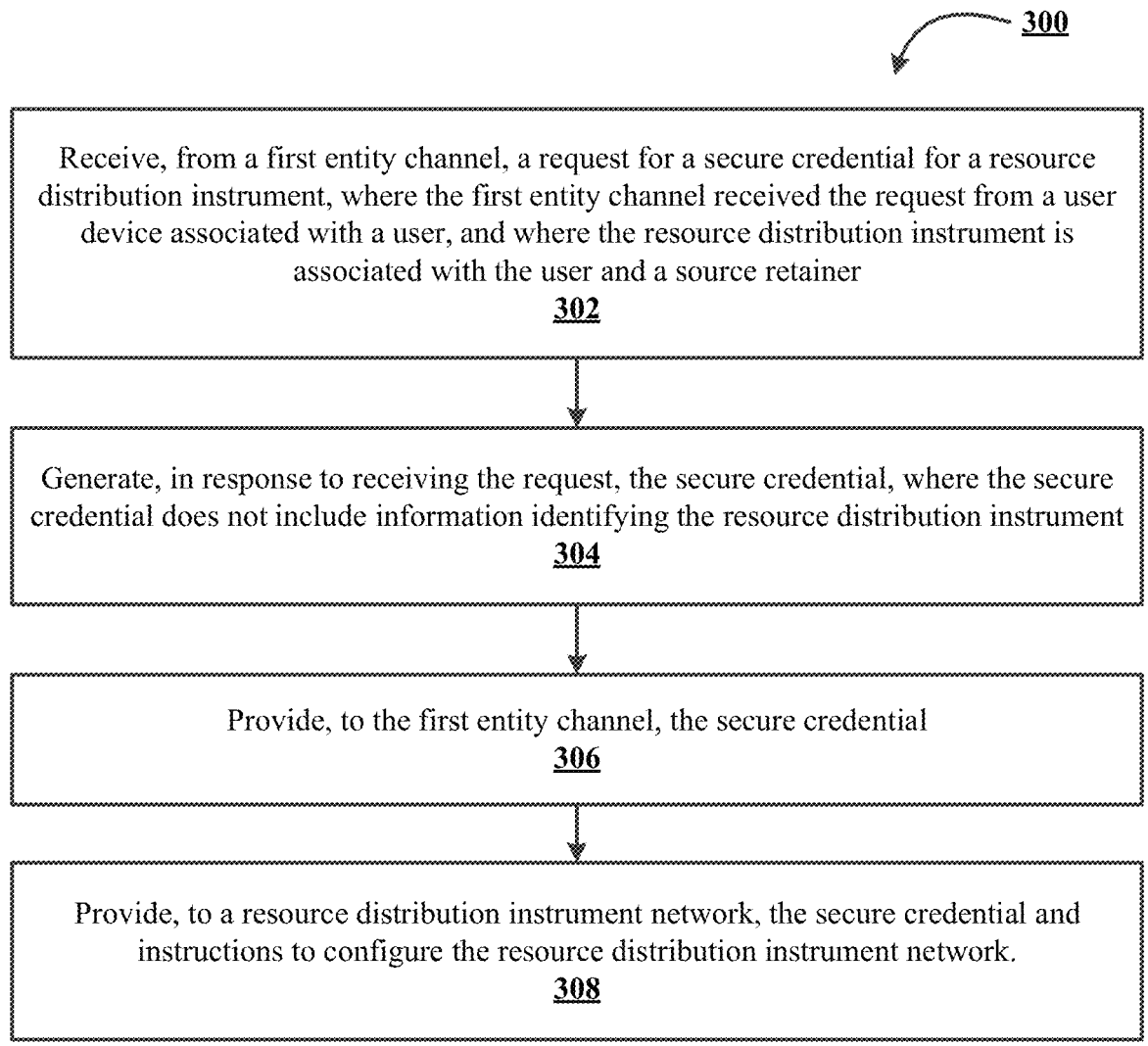

Having thus described embodiments of the invention in general terms, reference will now be made the accompanying drawings, wherein:

FIG. 1 illustrates technical components of a system for electronic tokenization of resource distribution instruments, in accordance with an embodiment of the invention;

FIG. 2 illustrates a process flow for electronic tokenization of resource distribution instruments, in accordance with an embodiment of the invention; and FIG. 3 illustrates a process flow for electronic tokenization of resource distribution instruments, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, an electronic system may be configured to receive and process requests for tokens that include information identifying a resource distribution instrument associated with a user. The electronic system may be configured to provide, in response to the requests, tokens for use in initiating future distributions with the user. An entity system may request the information identifying the resource distribution instrument from the user (e.g., by prompting the user via a display of a user device to input the information and/or the like) and may receive the information identifying the resource distribution instrument. The entity system may then transmit a request for a token that includes the information identifying the resource distribution instrument. However, when a user inputs and transmits the information identifying the resource distribution instrument and when the entity system receives, stores, and then further transmits the information identifying the resource distribution instrument, the information identifying the resource distribution instrument becomes subject to potential misappropriation. If the information identifying the resource distribution instrument is misappropriated by an unauthorized user, the unauthorized user may use the information identifying the resource distribution instrument to initiate distributions of resources from a source retainer associated with the user. Conventional systems may include security protocols to prevent such misappropriation, but implementing, managing, and operating such security protocols consumes significant computing resources, network resources, and financial resources. Furthermore, detecting misappropriation by unauthorized users, processing the unauthorized distributions, and then remedying the misappropriation further consumes computing resources, network resources, and financial resources. Additionally, when misappropriation occurs, users may communicate with an entity operating the electronic system and/or another entity operating the entity system and request that the misappropriation be reversed, which also unnecessarily consumes significant computing resources, network resources, and financial resources.

Some embodiments described herein provide a system, a computer program product, and/or a method for electronic tokenization of resource distribution instruments. In some embodiments, a user device may be configured to provide a request for a secure credential to a first entity channel in response to receiving a request for information identifying a resource distribution instrument associated with the user and a source retainer from a second entity system. Additionally, or alternatively, the first entity channel may be configured to receive the request and provide the request to a system (e.g., an electronic system for electronic tokenization of resource distribution instruments and/or the like).

In some embodiments, the system may be configured to receive, from the first entity channel, the request for the secure credential for the resource distribution instrument. Additionally, or alternatively, the system may be configured to generate, in response to receiving the request, the secure credential, where the secure credential does not include information identifying the resource distribution instrument, and provide, to the first entity channel, the secure credential. In some embodiments, the system may be configured to provide, to a resource distribution instrument network, the secure credential and instructions to configure the resource distribution instrument network to provide, in response to receiving a token request using the secure credential from the second entity system, a token for use by the second entity system during distributions between the user and the second entity system via the resource distribution instrument network, where the token does not include information identifying the resource distribution instrument, and transfer, in response to a distribution initiated by the second entity system using the token, resources from the source retainer associated with the resource distribution instrument to another source retainer associated with the second entity system.

In some embodiments, the first entity channel may be configured to receive the secure credential and, in response to receiving the secure credential, provide the secure credential to the user device. Additionally, or alternatively, the user device may be configured to receive the secure credential from the first entity channel and, in response to receiving the secure credential from the first entity channel, provide the secure credential to the second entity system. In some embodiments, the second entity system may be configured to receive the secure credential from the user device and provide, to a resource distribution instrument network, a token request using the secure credential. As noted and in some embodiments, the system may provide instructions to configure the resource distribution instrument network to provide, in response to receiving the token request using the secure credential from the second entity system, a token for use by the second entity system.

Additionally, or alternatively, the second entity system may be configured to receive, from the resource distribution instrument network, the token for use during distributions between the user and the second entity system via the resource distribution instrument network. In some embodiments, the second entity system may be configured to provide, to the resource distribution instrument network, the token to initiate the distribution. As noted, the system may provide instructions to configure the resource distribution instrument network to transfer, in response to a distribution initiated by the second entity system using the token, resources from the source retainer associated with the resource distribution instrument to another source retainer associated with the second entity system.

By requesting, generating, and providing the secure credential as well as configuring the resource distribution instrument network to provide a token in response to receiving the secure credential, the system prevents the user inputting and transmitting the information identifying the resource distribution instrument and the entity system receiving, storing, and then further transmitting the information identifying the resource distribution instrument, which significantly reduces a likelihood of misappropriation. By reducing the likelihood of misappropriation, the system prevents unauthorized users from using the information identifying the resource distribution instrument to initiate distributions of resources from a source retainer associated with the user, which conserves computing resources, network resources, and financial resources. By reducing the likelihood of misappropriation, the system makes renders security protocols of convention systems unnecessary, which conserves computing resources, network resources, and financial resources that would otherwise by consumed by implementing, managing, and operating such security protocols. By reducing the likelihood of misappropriation, the system conserves computing resources, network resources, and financial resources that would otherwise be consumed by detecting misappropriation by unauthorized users, processing the unauthorized distributions, and then remedying the misappropriation. By reducing the likelihood of misappropriation, the system conserves computing resources, network resources, and financial resources that would otherwise be consumed by users communicating with an entity operating the electronic system and/or another entity operating the entity system and requesting that the misappropriation be reversed.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to computing resources, computing services, objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, provision of computing resources, provision of computing services, a payment, processing of funds, purchase of goods or services, a return of goods or services, a payment transaction, a credit transaction, other interactions involving a user's resource or account, and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In the context of an entity such as a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution.

As used herein, "resource distribution instrument" may refer to an electronic payment vehicle, such as an electronic credit, debit card, and/or the like, associated with a source retainer (e.g., a checking account, a deposit account, a savings account, a credit account, and/or the like). As used herein, "auxiliary resource distribution instrument" may refer to an electronic payment vehicle, such as an electronic credit, debit card, and/or the like, associated with an auxiliary source retainer (e.g., an account associated with resources corresponding to secondary tangible resources and/or the like). In some embodiments, a resource distribution instrument and/or an auxiliary resource distribution instrument may be provided by a user to initiate, complete, conduct, and/or the like resource distributions and/or allocations of resources. In some embodiments, a resource distribution instrument and/or an auxiliary resource distribution instrument may not be a "card" and may instead be account identifying information stored electronically in a user device, such as payment credentials and/or tokens and/or aliases associated with a digital wallet, account identifiers stored by a mobile application, and/or the like.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

FIG. 1 presents an exemplary block diagram of a system environment 100 for electronic tokenization of resource distribution instruments within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile computing device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In some embodiments, the system 130 and the user input system 140 may be used to implement processes described herein, including user-side and server-side processes for electronic tokenization of resource distribution instruments, in accordance with an embodiment of the present invention. The system 130 may represent various forms of digital computers, such as laptops, desktops, workstations, personal digital assistants, servers, blade servers, mainframes, automated teller machines, and/or the like. The user input system 140 may represent various forms of devices, such as personal digital assistants, cellular telephones, smartphones, smart glasses, desktops, workstations, automated teller machines, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment 100 may include one or more user devices, first entity channels (e.g., entity managed systems), instrument systems of record, resource distribution instrument networks, entity systems, and/or the like (e.g., one or more of which may be similar to the system 130 and/or the user input system 140) associated with one or more entities (e.g., businesses, merchants, financial institutions, card management institutions, software and/or hardware development companies, software and/or hardware testing companies, and/or the like). In some embodiments, the one or more user devices, first entity channels (e.g., entity managed systems), instrument systems of record, resource distribution instrument networks, entity systems, and/or the like may perform one or more of the steps described herein with respect to the process flows described herein with respect to FIGS. 2 and/or 3.

FIG. 2 illustrates a process flow 200 for electronic tokenization of resource distribution instruments, in accordance with an embodiment of the invention. In some embodiments, one or more user devices, first entity channels (e.g., entity managed systems), instrument systems of record, resource distribution instrument networks, entity systems, and/or the like (e.g., similar to one or more of the systems described herein with respect to FIG. 1) may perform one or more of the steps of process flow 200.

In some embodiments, the process flow 200 may include a user using a user device to initiate an interaction with a second entity system. As shown in FIG. 2, the process flow 200 may include the second entity system may provide, to the user device, a request for resource distribution instrument information (e.g., information identifying a resource distribution instrument, information printed on a resource distribution instrument, and/or the like). For example, the second entity system may request the resource distribution instrument information and save the resource distribution instrument information to use during future interactions to initiate resource distributions between the user and the second entity system.

As shown in FIG. 2, the process flow 200 may include providing, via the user device, a request for a secure credential for a resource distribution instrument to the first entity channel (e.g., an entity system, such as a financial institution system, and/or the like). For example, rather than providing the resource distribution instrument information, the user may use the user device to request a secure credential for the resource distribution instrument from the first entity channel.

As shown in FIG. 2, the process flow 200 may include providing, via the first entity channel, the request for a secure credential for a resource distribution instrument to the instrument system of record (e.g., a resource distribution instrument system of record and/or the like). In some embodiments, the instrument system of record may include a data structure associating resource distribution instruments with entities (e.g., financial institutions and/or the like), source retainers, users, and/or the like. Additionally, or alternatively, the process flow 200 may include generating (e.g., with the instrument system of record) a secure credential for the resource distribution instrument and/or associating the secure credential with the resource distribution instrument in the data structure.

As shown in FIG. 2, the process flow 200 may include providing, to the resource distribution instrument network, the secure credential and a resource distribution instrument credential. For example, the resource distribution instrument credential may be associated with the resource distribution instrument for which the secure credential was generated.

In some embodiments, the process flow 200 may include providing, to the resource distribution instrument network, instructions to configure the resource distribution instrument network to perform one or more actions. For example, the instructions may configure the resource distribution instrument network to provide, in response to receiving a token request using the secure credential from another system, a token for use by the other system during distributions between the user and the other system via the resource distribution instrument network. Additionally, or alternatively, the instructions may configure the resource distribution instrument network to transfer, in response to a distribution initiated by the other system using the token, resources from a source retainer associated with the resource distribution instrument to another source retainer associated with the other system. In some embodiments, the instructions may configure the resource distribution instrument network to provide a token to another system after receiving the secure credential and perform resource distributions between the source retainers associated with the other system and a source retainer associated with the resource distribution instrument as if the other system had provided the resource distribution instrument network with information identifying the resource distribution instrument.

As shown in FIG. 2, the process flow 200 may include providing, with the instrument system of record, the secure credential to the first entity channel and providing, with the first entity channel, the secure credential to the user device. As also shown in FIG. 2, the process flow 200 may include providing, with the user device, the secure credential to the second entity system.

In some embodiments, and as shown in FIG. 2, the process flow 200 may include the second entity system providing, to the resource distribution instrument network, a request for a token using the secure credential (e.g., a request for a token, where the request includes the secure credential, and/or the like). As noted, the resource distribution network may be configured (e.g., by instructions from the instrument system of record, the first entity channel, and/or the like) to provide a token in response to the request for a token using the secure credential. As shown in FIG. 2, the process flow 200 may include providing, to the second entity system, a token for use in future distributions between the user and the second entity system via the resource distribution instrument network. In some embodiments, the process flow 200 may include storing, with the second entity system, the token for use in future distributions between the user and the second entity system via the resource distribution instrument network Additionally, or alternatively, the user may use the user device, another device, another system, and/or the like to initiate a distribution with the second entity system. In some embodiments, the second entity system may use the stored token to request a transfer of resources from a source retainer associated with the user and the resource distribution instrument to another source retainer associated with the second entity system. Additionally, or alternatively, the resource distribution instrument network may transfer, in response to the request including and/or based on the stored token, resources from the source retainer associated with the user and the resource distribution instrument to the other source retainer associated with the second entity system. In this way, the process flow 200 and associated systems and/or system environment may enable distributions of resources from the source retainer associated with the user and the resource distribution instrument without inputting, transmitting, storing, and/or the like information identifying the resource distribution instrument.

Process flow 200 may include additional embodiments, such as any single embodiment or any combination of embodiments described below and/or in connection with one or more other processes described elsewhere herein. Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

FIG. 3 illustrates a process flow 300 for electronic tokenization of resource distribution instruments, in accordance with an embodiment of the invention. In some embodiments, one or more user devices, first entity channels (e.g., entity managed systems), instrument systems of record, resource distribution instrument networks, entity systems, and/or the like (e.g., similar to one or more of the systems described herein with respect to FIG. 1) may perform one or more of the steps of process flow 300.

As shown in block 302, the process flow 300 may include receiving, from a first entity channel, a request for a secure credential for a resource distribution instrument, where the first entity channel received the request from a user device associated with a user, and where the resource distribution instrument is associated with the user and a source retainer. In some embodiments, the process flow 300 may be preceded and/or followed by one or more of the steps of process flow 200. For example, the process flow 300 may include the user device receiving a request for resource distribution instrument information and providing the request for the secure credential to the first entity channel.

As shown in block 304, the process flow 300 may include generating, in response to receiving the request, the secure credential, where the secure credential does not include information identifying the resource distribution instrument. For example, the secure credential may include an alpha-numeric set of characters and/or digits, a code, and/or the like.

In some embodiments, generating the secure credential may include generating input for each input field of a user interface for receiving information identifying a resource distribution instrument. Additionally, or alternatively, the secure credential may include inputs for the input fields having a correct format/type for the input field. For example, the secure credential may include an input having a number of digits that corresponds to the number of digits on a resource distribution instrument, another input having a format that corresponds to a data on a resource distribution instrument, another input having characters in a format that corresponds to a name on a resource distribution instrument, another input having a format that corresponds to an authentication credential on a resource distribution instrument, and/or the like. In some embodiments, generating the secure credential may include generating an image that appears to be a resource distribution instrument, such that, when the user device scans the image (e.g., via an application, software, and/or the like), information is generated that corresponds to input fields of a user interface for receiving information identifying a resource distribution instrument.

As shown in block 306, the process flow 300 may include providing, to the first entity channel, the secure credential. For example, the process flow 300 may include providing and/or transmitting an alpha-numeric set of characters and/or digits, a code, one or more inputs for input fields of a user interface, an image, and/or the like.

As shown in block 308, the process flow 300 may include providing, to a resource distribution instrument network, the secure credential and instructions to configure the resource distribution instrument network. In some embodiments, the instructions may configure the resource distribution instrument network to provide, in response to receiving a token request using the secure credential from a second entity system, a token for use by the second entity system during distributions between the user and the second entity system via the resource distribution instrument network, where the token does not include information identifying the resource distribution instrument. Additionally, or alternatively, the instructions may configure the resource distribution instrument network to transfer, in response to a distribution initiated by the second entity system using the token, resources from the source retainer associated with the resource distribution instrument to another source retainer associated with the second entity system.

In some embodiments, the process flow 300 may include reconfiguring the resource distribution instrument network using the secure credential such that the resource distribution instrument network provides, in response to receiving a token request using the secure credential from a second entity system, a token for use by the second entity system during distributions between the user and the second entity system via the resource distribution instrument network. Additionally, or alternatively, the process flow 300 may include reconfiguring the resource distribution instrument network using the secure credential such that the resource distribution instrument network transfers, in response to a distribution initiated by the second entity system using the token, resources from the source retainer associated with the resource distribution instrument to another source retainer associated with the second entity system.

In some embodiments, the process flow 300 may include providing, in response to receiving a token request using the secure credential from a second entity system, a token for use by the second entity system during distributions between the user and the second entity system. Additionally, or alternatively, the process flow 300 may include transferring, in response to a distribution initiated by the second entity system using the token, resources from the source retainer associated with the resource distribution instrument to another source retainer associated with the second entity system.

Process flow 300 may include additional embodiments, such as any single embodiment or any combination of embodiments described below and/or in connection with one or more other processes described elsewhere herein.

In a first embodiment, the user device may be configured to provide the request to the first entity channel in response to receiving a request for the information identifying the resource distribution instrument from the second entity system.

In a second embodiment alone or in combination with the first embodiment, the first entity channel may be configured to receive the secure credential and, in response to receiving the secure credential, provide the secure credential to the user device.

In a third embodiment alone or in combination with any of the first through second embodiments, the user device may be configured to receive the secure credential from the first entity channel and, in response to receiving the secure credential from the first entity channel, provide the secure credential to the second entity system.

In a fourth embodiment alone or in combination with any of the first through third embodiments, the second entity system may be configured to provide, to the user device, a request for the information identifying the resource distribution instrument, receive the secure credential from the user device, in response to receiving the secure credential from the user device, provide, to the resource distribution instrument network, the token request using the secure credential, and receive, from the resource distribution instrument network, the token for use during distributions between the user and the second entity system via the resource distribution instrument network.

In a fifth embodiment alone or in combination with any of the first through fourth embodiments, the second entity system may be configured to provide, to the resource distribution instrument network, the token to initiate the distribution.

In a sixth embodiment alone or in combination with any of the first through fifth embodiments, the process flow 300 may include providing, to the resource distribution instrument network, other instructions to configure the resource distribution instrument network to provide, in response to the token request using the secure credential from the second entity system, a token notification indicating use of the secure credential to the system and receiving, from the resource distribution instrument network, the token notification.

In a seventh embodiment alone or in combination with any of the first through sixth embodiments, the process flow 300 may include, in response to receiving the token notification from the resource distribution instrument network, providing, to the first entity channel, the token notification.

In an eighth embodiment alone or in combination with any of the first through seventh embodiments, the process flow 300 may include providing, to the resource distribution instrument network, other instructions to configure the resource distribution instrument network to, before transferring the resources, determine, in response to the distribution initiated by the second entity system using the token, whether the token has expired, when transferring the resources, transfer the resources based on determining that the token has not expired, and deny the distribution initiated by the second entity system based on determining that the token has expired.

In a ninth embodiment alone or in combination with any of the first through eighth embodiments, the process flow 300 may include providing other instructions to configure the resource distribution instrument network to determine, in response to receiving the token request using the secure credential from the second entity system, whether the secure credential has expired and, when providing the instructions to configure the resource distribution instrument network to provide the token, providing the instructions to configure the resource distribution instrument network to provide the token based on determining that the secure credential has not expired.

In a tenth embodiment alone or in combination with any of the first through ninth embodiments, the process flow 300 may include, when generating the secure credential, generating a unique secure credential.

In an eleventh embodiment alone or in combination with any of the first through tenth embodiments, the request for the secure credential may include data identifying the second entity system, and the process flow 300 may include, when generating the secure credential, generating the secure credential based on the data identifying the second entity system, and, when providing the instructions to configure the resource distribution instrument network to provide the token, providing the instructions to configure the resource distribution instrument network to determine whether the second entity system provided the token request using the secure credential and provide the token only based on determining that the second entity system provided the token request using the secure credential.

In a twelfth embodiment alone or in combination with any of the first through eleventh embodiments, the process flow 300 may include receiving, from the first entity channel, another request for another secure credential for the resource distribution instrument, wherein the other request comprises data identifying a third entity system, generating, in response to receiving the other request, the other secure credential, where the other secure credential is different from the secure credential, and providing, to the first entity channel, the other secure credential.

In a thirteenth embodiment alone or in combination with any of the first through twelfth embodiments, the process flow 300 may include providing, to the resource distribution instrument network, the other secure credential and instructions to configure the resource distribution instrument network to provide, in response to receiving another token request using the other secure credential from the third entity system, another token for use by the third entity system during distributions between the user and the third entity system via the resource distribution instrument network, where the other token does not include information identifying the resource distribution instrument, and where the other token is different from the token and transfer, in response to another distribution initiated by the third entity system using the other token, resources from the source retainer associated with the resource distribution instrument to a third source retainer associated with the third entity system.

Although FIG. 3 shows example blocks of process flow 300, in some embodiments, process flow 300 may include additional blocks, fewer blocks, different blocks, or differently arranged blocks than those depicted in FIG. 3. Additionally, or alternatively, two or more of the blocks of process flow 300 may be performed in parallel.

To complete a transaction, a user may be required to provide a merchant with information identifying a resource distribution instrument (e.g., credit card information, debit card information, and/or the like). However, the user may prefer not to provide such information electronically (e.g., over the internet) to some merchants. In some embodiments, the system and/or system environment described herein may permit a user to add a resource distribution instrument to a merchant system (e.g., a customer summary, a customer account, and/or the like) without providing real information identifying the resource distribution instrument. For example, a system may provide a secure credential (e.g., a secure add element), where the user can obtain the secure credential from their financial institution and/or their account. The secure credential may be an alpha numeric set of digits that may be sent from the financial institution to the user. The secure credential may be deciphered to identify a card, financial institution, and/or user associated with the alpha numeric number and the resource distribution instrument network (e.g., the card network) is notified of this secure credential being sent. The secure credential may then be provided to the merchant. The merchant may provide the secure credential to the resource distribution instrument network, which already has the secure credential and may tokenize and process a transaction with the merchant without providing the merchant with real card information.

In some embodiments, the user may request the secure credential via an online portal (e.g., in a web browser and/or the like), via an application running on a user device, and/or the like. Additionally, or alternatively, the secure credential may identify the associated card network, the issuing bank, and the user's card. In some embodiments, the issuing bank may notify the card network with the secure credential and associated card details. Additionally, or alternatively, the merchant may provide the secure credential to the card network to obtain a digital token that may be used for future interactions (e.g., transactions). In some embodiments, the card network may notify the issuing bank of the creation of the new token based on the secure credential. Additionally, or alternatively, the secure credential may expire after a duration of time, a number of uses, a number of interactions, a number of transactions, and/or the like.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for electronic tokenization of resource distribution instruments, the system comprising: an instrument system and a resource distribution network;

the instrument system comprising at least one instrument system non-transitory storage device and at least one instrument system processing device, the instrument system non-transitory storage device comprising computer executable instructions, when executed by the instrument system processing device causes the instrument system processing device to perform steps of:

receiving, from a first entity channel, a request for a secure credential for a resource distribution instrument, wherein the first entity channel received the request from a user device associated with a user, and wherein the resource distribution instrument is associated with the user and a source retainer;

generating, in response to receiving the request, the secure credential, wherein the secure credential does not comprise information identifying the resource distribution instrument;

providing, to the first entity channel, the secure credential;

providing, to the resource distribution instrument network, the secure credential;

the distribution instrument network comprising at least one distribution instrument network non-transitory storage device and at least one distribution instrument network processing device, the distribution instrument network non-transitory storage device comprising computer executable instructions, when executed by the distribution instrument network processing device causes the distribution instrument network processing device to perform steps of:

receiving, a token request from a second entity system, wherein the token request comprising the secure credential;

generating, based on the secure credential, a token that is specific between the user and the second entity system;

receiving, a resource transfer request from the second entity system, wherein the resource transfer request comprising the token; and transferring, and in response to verifying the token, resources from the source retainer associated with the resource distribution instrument to another source retainer associated with the second entity system.

2. The system of claim 1, further comprising the user device comprising at least one user device non-transitory storage device and at least one user device processing device, the user device non-transitory storage device comprising computer executable instructions, when executed by the user device processing device causes the user device processing device to perform step of: providing the request to the first entity channel in response to receiving a request for the information identifying the resource distribution instrument from the second entity system.

3. The system of claim 2, further comprising the first entity channel comprising at least one first entity channel non-transitory storage device and at least one first entity channel processing device, the first entity channel non-transitory storage device comprising computer executable instructions, when executed by the first entity channel processing device causes the first entity channel processing device to perform step of: receiving the secure credential; and in response to receiving the secure credential, providing the secure credential to the user device.

4. The system of claim 3, wherein the user device processing device further perform step of: receiving the secure credential from the first entity channel; and
in response to receiving the secure credential from the first entity channel, provide the secure credential to the second entity system.

5. The system of claim 4, further comprising the second entity system comprising at least one second entity system non-transitory storage device and at least one second entity system processing device, the second entity system non-transitory storage device comprising computer executable instructions, when executed by the second entity system processing device causes the second entity system processing device to perform step of:
providing, to the user device, a request for the information identifying the resource distribution instrument;
receiving the secure credential from the user device;
in response to receiving the secure credential from the user device, providing, to the resource distribution instrument network, the token request using the secure credential; and
receiving, from the resource distribution instrument network, the token for use during distributions between the user and the second entity system via the resource distribution instrument network.

6. The system of claim 1, wherein the distribution instrument network processing device further perform step of:
providing, in response to receiving the token request from the second entity system, a token notification to the instrument system.

7. The system of claim 6, wherein the instrument system processing device further perform step of: response to receiving the token notification from the resource distribution instrument network, providing, to the first entity channel, the token notification.

8. The system of claim 1, wherein verifying the token comprising:
determining, in response to the resource transfer request from the second entity system, whether the token has expired;
in response to the determining that the token has not expired, transferring the resources; and
in response to the determination that the token has expired deny the resource transfer request from the second entity system.

9. The system of claim 1, wherein the distribution instrument network processing device further perform step of:
determining, in response to receiving the token request using the secure credential from the second entity system, whether the secure credential has expired; and
providing, the token based on determining that the secure credential has not expired.

10. The system of claim 1, wherein generating the secure credential comprises, generating a unique secure credential.

11. The system of claim 1, wherein the request for the secure credential comprises data identifying the second entity system, and wherein the instrument system processing device further perform step of:
generating the secure credential based on the data identifying the second entity system; and
wherein the distribution instrument network processing device further perform step of:
determining whether the second entity system provided the token request using the secure credential; and
providing the token only based on determining that the second entity system provided the token request using the secure credential.

12. The system of claim 1, wherein the instrument system processing device further perform step of:
receiving, from the first entity channel, another request for another secure credential for the resource distribution instrument, wherein the other request comprises data identifying a third entity system;
generating, in response to receiving the other request, the other secure credential, wherein the other secure credential is different from the secure credential; and
providing, to the first entity channel, the other secure credential.

13. The system of claim 12, wherein the distribution instrument network processing device further perform step of:
receiving another token request from the third entity system, wherein another token request comprising the other secure credential;
generating, based on the other secure credential, another token that is specific between the user and the third entity system;
receiving a resource transfer request from the third entity system, wherein the resource transfer request comprising the other token;
transferring, and in response to verifying the other token, resources from the source retainer associated with the resource distribution instrument to a third source retainer associated with the third entity system.

14. The system of claim 1, wherein the instrument system processing device further perform step of:
receiving, from the first entity channel, an other request for an other secure credential for the resource distribution instrument and comprising data identifying a third entity system;
generating, in response to receiving the other request, the other secure credential, wherein the secure credential does not comprise information identifying the resource distribution instrument and wherein the other secure credential is different from the secure credential;

providing, to the first entity channel, the other secure credential;

providing, to the resource distribution instrument network, the other secure credential and an other token request using the other secure credential from the third entity system; and wherein the distribution instrument network processing device further perform step of:

generating, based on the third entity system provided the other token request with the other secure credential, an other token that is specific between the user and the third entity system using the resource distribution instrument network.

15. A method for electronic tokenization of resource distribution instruments, the method comprising:

receiving, by an instrument system, from a first entity channel, a request for a secure credential for a resource distribution instrument and comprising data identifying a second entity system, wherein the first entity channel received the request from a user device associated with a user, and wherein the resource distribution instrument is associated with the user and a source retainer;

generating, by the instrument system, in response to receiving the request, the secure credential, wherein the secure credential does not comprise information identifying the resource distribution instrument;

providing, by the instrument system, to the first entity channel, the secure credential;

providing, by the instrument system, to a resource distribution instrument network, the secure credential;

receiving, by the resource distribution instrument network, a token request from a second entity system, wherein the token request comprising the secure credential;

generating, by the resource distribution instrument network and based on the secure credential, a token that is specific between the user and the second entity system;

receiving, by the resource distribution instrument network a resource transfer request from the second entity system, wherein the resource transfer request comprising the token;

and transferring, by the resource distribution instrument network and in response to verifying the token, resources from the source retainer associated with the resource distribution instrument to another source retainer associated with the second entity system.

* * * * *